US009986159B2

(12) United States Patent
Bang

(10) Patent No.: US 9,986,159 B2
(45) Date of Patent: May 29, 2018

(54) TECHNIQUE FOR REDUCING THE POWER CONSUMPTION FOR A VIDEO ENCODER ENGINE

(71) Applicant: NVIDIA Corporation, Santa Clara, CA (US)

(72) Inventor: Jihoon Bang, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1398 days.

(21) Appl. No.: 13/857,950

(22) Filed: Apr. 5, 2013

(65) Prior Publication Data
US 2014/0300778 A1 Oct. 9, 2014

(51) Int. Cl.
H04N 19/152 (2014.01)
H04N 5/232 (2006.01)
H04N 19/127 (2014.01)
H04N 19/436 (2014.01)

(52) U.S. Cl.
CPC ....... *H04N 5/23241* (2013.01); *H04N 19/127* (2014.11); *H04N 19/152* (2014.11); *H04N 19/436* (2014.11)

(58) Field of Classification Search
CPC .................................................. H04N 5/23241
See application file for complete search history.

(56) References Cited

U.S. PATENT DOCUMENTS

| | | | | |
|---|---|---|---|---|
| 5,473,385 A * | 12/1995 | Leske | .................. | H04N 5/4401 348/464 |
| 5,841,481 A * | 11/1998 | Yoshikawa | ............... | H04N 7/56 348/500 |
| 6,359,948 B1 * | 3/2002 | Turudic | .................. | H03K 23/66 327/3 |
| 7,747,090 B2 * | 6/2010 | Lin | ......................... | H04N 19/60 382/232 |
| 8,924,753 B2 * | 12/2014 | Park | ...................... | G06F 1/3215 710/110 |
| 2003/0115428 A1 * | 6/2003 | Zaccarin | ............... | G06F 1/3203 711/156 |
| 2005/0008011 A1 * | 1/2005 | Georgiou | ................ | H04L 49/90 370/389 |
| 2005/0138459 A1 * | 6/2005 | Yoon | ........................ | G06F 5/06 713/600 |
| 2005/0265462 A1 * | 12/2005 | Bueti | .................... | G06F 1/3203 375/257 |
| 2007/0069778 A1 * | 3/2007 | Choi | ......................... | G06F 7/68 327/158 |
| 2008/0267293 A1 * | 10/2008 | Swami | ................. | H04N 19/159 375/240.16 |
| 2009/0240971 A1 * | 9/2009 | Gupta | ................. | G06F 13/1663 713/501 |

\* cited by examiner

*Primary Examiner* — Jay Patel
*Assistant Examiner* — Irfan Habib
(74) *Attorney, Agent, or Firm* — Artegis Law Group, LLP

(57) ABSTRACT

Raw video data is captured, processed, and then stored within a set of buffers. An encoder engine is configured to encode the video data for storage. A feedback controller dynamically adjusts the clock frequency of the encoder engine based on the number of buffers currently occupied by the video data. The feedback controller is tuned so that the clock frequency of the encoder engine will be increased when the number of buffers occupied by video data increases, and the clock frequency of the encoder engine will be decreased when the number of buffers occupied by the video data decreases.

20 Claims, 4 Drawing Sheets

TECHNIQUE FOR REDUCING THE POWER CONSUMPTION FOR A VIDEO ENCODER ENGINE

BACKGROUND OF THE INVENTION

Field of the Invention

The present invention generally relates to video processing, and, more specifically, to a technique for reducing the power consumption of a video encoder engine.

Description of the Related Art

A conventional digital camera is typically configured to capture raw video data, process that raw video data, and then encode the processed video data according to a compression standard for storage purposes. An encoder engine within the digital camera typically is a fixed-function hardware unit that is responsible for encoding the processed video data and is usually programmed to implement a particular compression standard. For example, a Moving Picture Experts Group (MPEG) encoder engine could be responsible for encoding processed video data into an H.264 compressed format.

The rate at which the processed video data is made available to the encoder engine may vary over time according to the frame rate at which the raw video data is captured, the resolution of that raw video data, and/or a color format associated with the raw video data, among other factors. These latency variations may be partially absorbed by temporarily storing the processed video data in a buffer that is accessible by the encoder engine. However, the encoder engine must consume the processed video data from the buffer with sufficient speed so that the buffer does not overflow. Consequently, the clock frequency of the encoder engine is typically pre-set to the maximum frequency that is needed to prevent buffer overflow.

One drawback of this approach is that the encoder engine may operate with the pre-set maximum frequency even in situations where the processed video data is pushed into the buffer at a very low rate. In these situations, the encoder engine may be idle across many cycles, thereby wasting power. Further, maintaining the aforementioned maximum clock frequency may require the core power of the conventional digital camera to be increased simply to support the operation of the encoder engine. In such situations, the core power may be increased even when none of the other components within the conventional digital camera requires such a power increase, thereby wasting additional power.

Accordingly, what is needed in the art is a more power-efficient encoder engine.

SUMMARY OF THE INVENTION

One embodiment of the present invention includes a computer-implemented method for encoding data, including identifying a number of buffers occupied by one or more portions of data, determining a scaled clock frequency for an encoder unit based on the number of buffers occupied by the one or more portions of data, and encoding the one or more portions of data at the scaled clock frequency to generate one or more portions of encoded data.

An advantage of the disclosed approach is that the power requirements of the encoder engine may be decreased because the number of idle clock cycles performed by the encoder engine may be reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Computer System Overview

Figure 1:
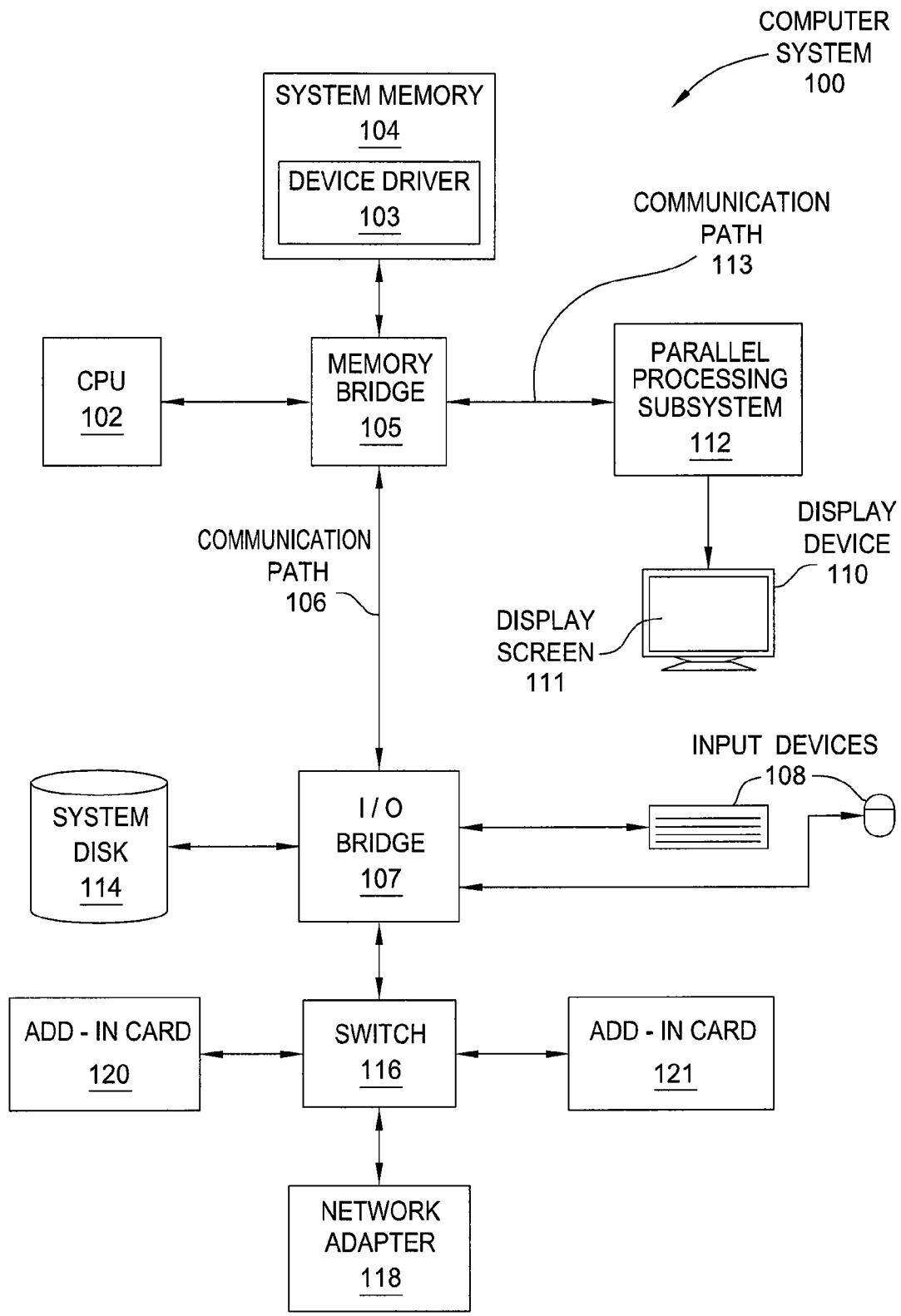
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
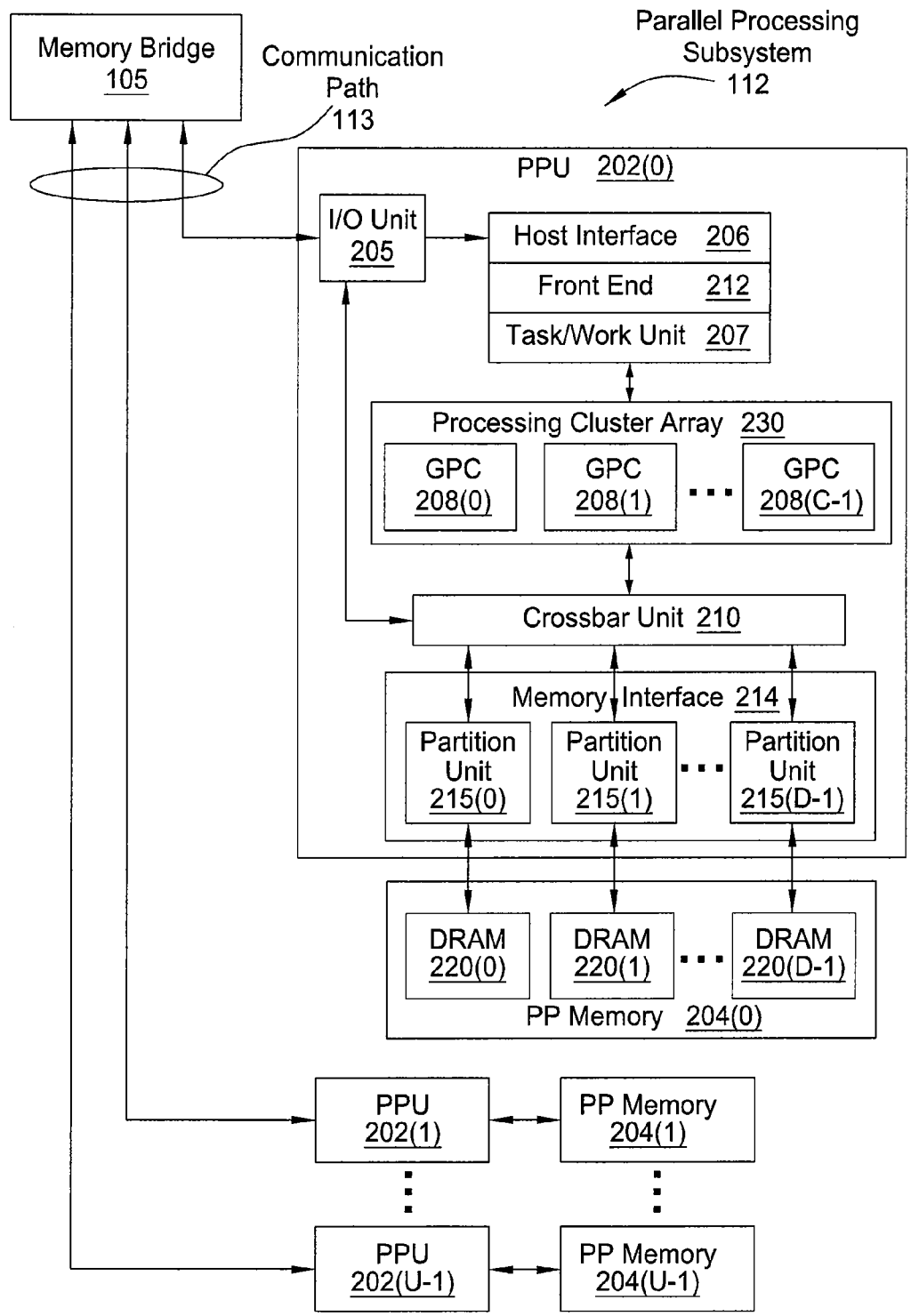
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212.

Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D 1. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Reducing the Power Consumption of a Video Encoder Engine

Figure 3:
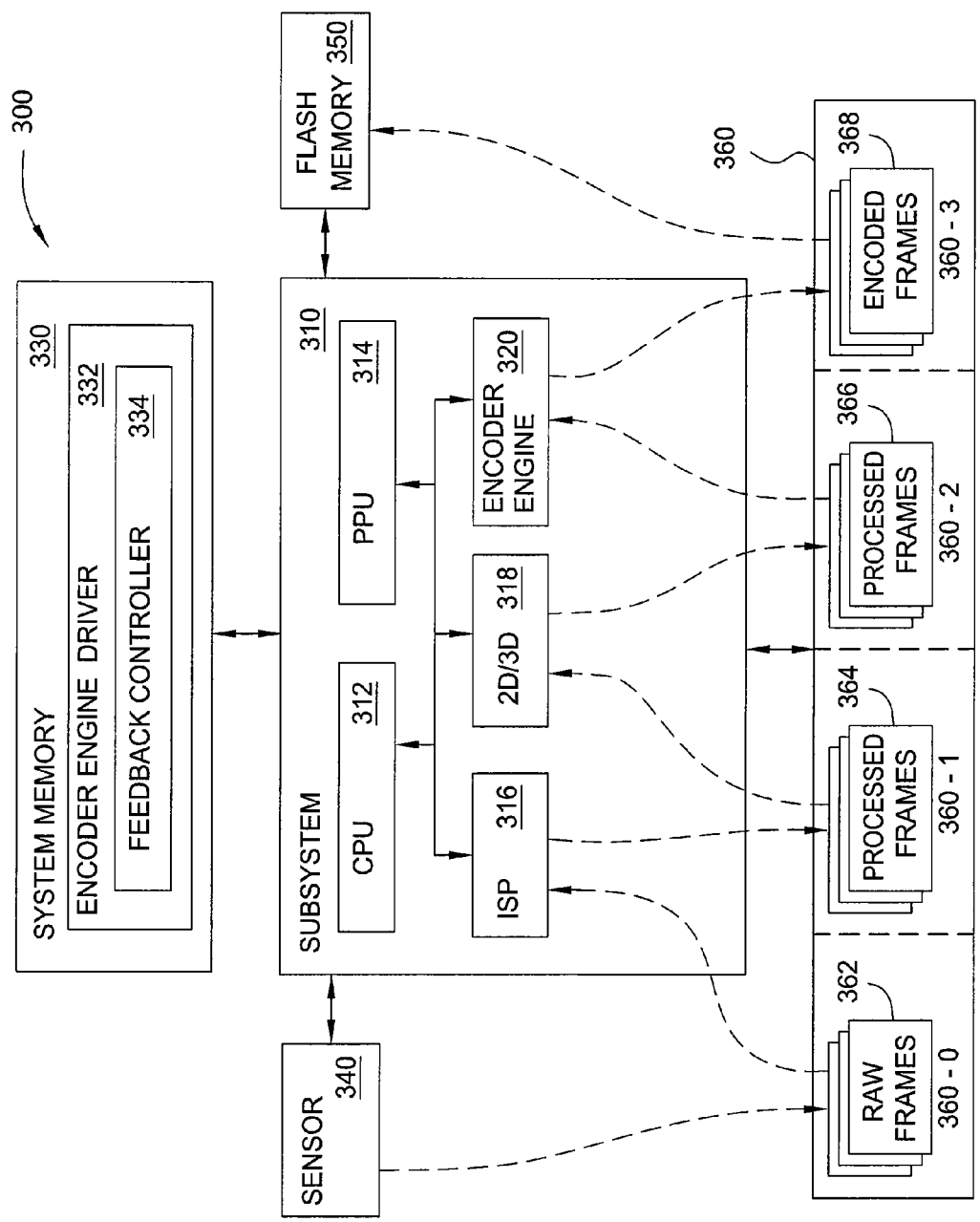
FIG. 3 is a block diagram of a system configured to encode video data, according to one embodiment of the present invention.

FIG. 3 is a block diagram of a system 300 configured to encode video data, according to one embodiment of the present invention. System 300 may be included within a mobile device, such as a cellular telephone or a tablet computer, may be incorporated into a digital video camera, and may be included within computer system 100 shown in FIG. 1. As shown, system 300 includes a subsystem 310 coupled to a system memory 330, a sensor 340, a flash memory 350, and a random-access memory (RAM) module 360.

Subsystem 310 may be a system-on-a-chip (SoC) and, thus, may be configured to perform a wide range of different processing operations. In the embodiment of the present invention discussed herein, subsystem 310 is configured to process raw video data received from sensor 340 and to compress that data for storage within flash memory 350. In doing so, subsystem 310 may store video data at different stages of processing within RAM module 360. Subsystem 310 may perform the aforementioned functions based on software applications stored within system memory 330, as described in greater detail herein.

As shown, subsystem 310 includes a central processing unit (CPU) 312, a parallel processing unit (PPU) 314, an image signal processor (ISP) 316, a two-dimensional (2D)/three-dimensional (3D) processor 318, and an encoder engine 320. CPU 312 is a processing unit configured to execute software applications and may be similar to CPU 102 shown in FIG. 1. PPU 314 is a parallel processing unit configured to execute multiple threads in parallel with one another and may be similar to PPU 202 shown in FIG. 2. In one embodiment, PPU 314 may be a graphics processing unit (GPU). ISP 316 is a hardware unit that is configured to perform various image processing operations. 2D/3D processor 318 is a hardware unit configured to perform 2D and 3D rendering. Encoder engine 320 is a hardware unit configured to encode frames of video data according to a compression standard, such as, e.g. H.264. The operation of these different components is described in greater detail by way of example below.

System memory 330 is a memory module configured to store software applications for execution by CPU 312 and PPU 314. Those applications may include an operating system (OS) and various driver programs that allow CPU 312 and/or PPU 314 to coordinate the operation of the different components within subsystem 310. As shown, system memory 330 includes an encoder engine driver 332 that includes a feedback controller 334. CPU 312 is configured to execute encoder engine driver 332 in order to coordinate the operation of encoder engine 320. When executed by CPU 312, encoder engine 332 implements feedback controller 334 in order to scale the clock frequency of encoder engine 320 relative to an amount of video data to be encoded by encoder engine 320, as described in greater detail below.

Sensor 340 may be an optical sensor configured to capture video data, and may include a charge-coupled device (CCD), color filter array (CFA), or other components capable of converting light waves into digital signals. Sensor 340 is configured to capture video data for processing and encoding by subsystem 310. The processed and encoded video data may then be stored within flash memory 350. Flash memory 350 may be an embedded multi-media card (EMMC), a secure digital (SD) card, or another type of non-volatile memory.

When processing video data, subsystem 310 is configured to store video data at various stages of processing within RAM module 360, as previously mentioned. RAM module 360 may be a double-data rate (DDR) RAM module or another type of volatile memory module. RAM module 360 is configured to include different sets of buffers, where each set of buffers is configured to store video data at a different stage of processing. In FIG. 3, RAM module 360 includes sets 360-0, 360-1, 360-2, and 360-3 of buffers, where each such set of buffers represents a number of different buffers capable of storing a corresponding number of different frames of video data. In practice, RAM module 360 may be include any number of different sets of buffers and may also include additional space reserved for other uses, such as, e.g., applications and application data, etc. In one embodiment, RAM module 360 and system memory 330 may each represent different portions of a single memory unit configured to store applications, application data, buffered video data, and other types of data associated with the operation of computer system 300 as a whole.

In operation, sensor 340 is configured to capture video data and to store that data as raw frames 362 within set 360-0 of buffers. ISP 316 may then retrieve raw frames 362 from set 360-0 of buffers and perform one or more image processing operations with raw frames 362 to generate processed frames 364. ISP 316 is configured to store processed frames 364 within set 360-1 of buffers, as is shown. 2D/3D processor 318 may then retrieve processed frames 364 from set 360-1 of buffers and perform 2D and/or 3D rendering tasks with processed frames 360-1 to generate processed frames 366. 2D/3D processor 318 is configured to store processed frames 366 within set 360-2 of buffers, as is shown. Processed frames 366 may represent, for example, MP patch data. Encoder engine 320 may then retrieve processed frames 366 from set 360-2 of buffers and perform one or more encoding operations with processed frames 366 to generate encoded frames 368. Encoder engine 320 is configured to store encoded frames 368 within set 360-3 of buffers, as is shown. CPU 312 may then store encoded frames 368 within flash memory 350. In one embodiment, PPU 314 may perform additional processing tasks with any of the frames stored in RAM module 360.

When 2D/3D processor 318 generates processed frames 366, 2D/3D processor 318 may store those processed frames 366 within set 360-2 of buffers with a wide range of different rates depending on how quickly 2D/3D processor 318 is capable of generating those processed frames. Accordingly, set 360-2 of buffers may "fill up" with processed frames 366 slowly or quickly depending on the current processing throughput of 2D/3D processor 318 at any given moment. The rate with which 2D/3D processor 318 is capable of generating processed frames 366 may depend on various factors, including the frame rate with which sensor 340 is configured to capture data, the resolution within which sensor 340 is configured to capture data, or the color format with which sensor 340 is configured to capture data, among other factors. In addition to affecting the processing throughput of 2D/3D processor 318, any of the aforementioned factors may also affect the processing throughput of ISP 316 or other processing stages that may reside upstream of 2D/3D processor 318. In general, the rate with which processed frames 366 are introduced into set 360-2 of buffers, and thus made available to encoder engine 320, may vary over time.

In order to account for these variations, CPU 312 is configured to execute encoder engine driver 332 and feedback controller 334 included therein to adjust the clock frequency with which encoder engine 320 encodes processed frames 366 based on the number of buffers within set 360-2 of buffers occupied by processed frames 366. When executed by CPU 312, feedback controller 334 is configured to monitor the number of buffers within set 360-2 of buffers occupied by processed frames 366 and to increase the clock frequency of encoder engine 320 when that number of buffers increases. Likewise, feedback controller 334 is also configured to decrease the clock frequency of encoder engine 320 when that number of buffers decreases. With this approach, the clock frequency of encoder engine 320 may be dynamically adjusted to provide a precise processing throughput that reflects the current amount of encoding tasks associated with processed frames 366 within set 360-2 of buffers.

Feedback controller 334 may be any type of feedback controller, although in practice feedback controller 334 is a proportional-integral-derivative (PID) controller that is configured with a particular set of gain coefficients. The set of gain coefficients includes a proportional coefficient, an integral coefficient, and a derivative coefficient, as is known in the art. The numerical values of these different coefficients may be pre-determined heuristically, and so feedback controller 334 may satisfy a particular set of response characteristics, such as, e.g. desired overshoot, damping, and so forth.

In addition, feedback controller 334 is generally configured to adjust the clock frequency of encoder engine 320 so that the number of buffers within set 360-2 of buffers remains relatively constant over time. In one embodiment, feedback controller 334 is configured to adjust the clock frequency of encoder engine 320 so that approximately half of the buffers within set 360-2 of buffers are occupied by processed frames 366 at a given moment. Persons skilled in the art will recognize that the response characteristics of feedback controller 334 may be modified, e.g. by adjusting the set of gain coefficients, as needed in order to provide the functionality described herein. Although feedback controller 334 is described herein as being implemented as software within encoder engine driver 332, persons skilled in the art will recognize that feedback controller 334 may also be implemented as a standalone hardware unit configured to adjust the clock frequency of encoder engine 320 or as a combination of hardware and software.

With the approach described above, the power consumed by encoder engine 320 may be significantly reduced compared to previous designs. Since the power consumption of encoder engine 320 scales with clock frequency squared, as is known in the art, reducing the clock frequency of encoder engine 320 in situations where a high clock frequency is not necessary may reduce the power requirements of encoder engine 320.

Moreover, reducing the power requirements of encoder engine 320 may also reduce the power requirements of subsystem 310 as a whole. In previous designs, an encoder engine would consume more power than other hardware components, and so the core power that would be provided to all hardware components within such previous designs would be elevated simply to provide sufficient power to the encoder engine. However, with the approach described herein, encoder engine 320 is far more power efficient than encoder engines within previous designs, and so the core power required by subsystem 310 may be reduced.

Figure 4:
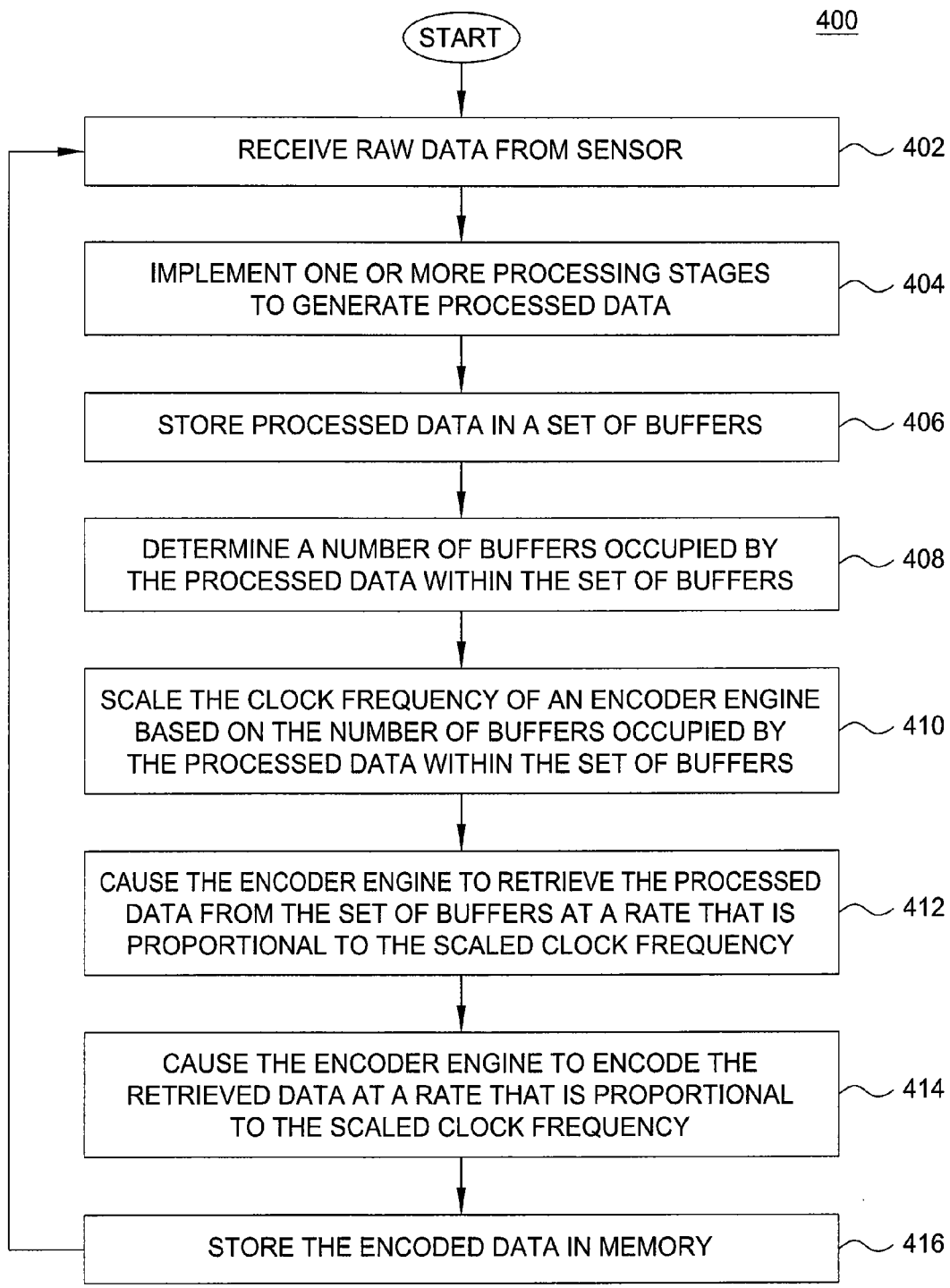
FIG. 4 if a flow diagram of method steps for encoding video data, according to one embodiment of the present invention.

FIG. 4 is a flow diagram of method steps for encoding video data, according to one embodiment of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where subsystem 310 receives raw video data from sensor 340. Subsystem 310 is configured to store the raw data received from sensor 340 within set 360-0 of buffers as raw frames 362. At step 404, subsystem 310 implements one or more processing stages to generate processed frames 366. The one or more processing stages could include, for example, ISP 316 and 2D/3D processor 318, among others. At step 406, subsystem 310 stores processed frames 366 within set 360-2 of buffers.

At step 408, subsystem 310 determines a number of buffers occupied by processed frames 366 within set 360-2 of buffer. In doing so, CPU 312 within subsystem 310 could execute a driver application configured to monitor buffer usage associated with RAM module 360. At step 410, CPU 312 within subsystem 310 executes encoder engine driver 334 in order to scale the clock frequency of encoder engine 320 based on the number of buffers within set 360-2 of buffers currently occupied by processed frames 366. In doing so, CPU 312 may execute feedback controller 334 in order to generate a clock frequency for encoder engine 320 that will bring the number of buffers within set 360-2 of buffers occupied by processed frames 366 to a desired level. In one embodiment, that desired level is approximately half of the total number of buffers within set 360-2 of buffers.

At step 412, CPU 312 within subsystem 310 executes encoder engine driver 334 in order to cause encoder engine 320 to retrieve processed frames 360 from set 360-2 of buffers at a rate that is proportional to the scaled clock frequency of encoder engine 320. At step 414, CPU 312 within subsystem 310 executes encoder engine driver 334 in order to cause encoder engine 320 to generate encoded frames 368 by encoding processed frames 360 retrieved from set 360-2 of buffers at a rate that is proportional to the scaled clock frequency of encoder engine 320.

In one embodiment, encoder engine 320 may implement steps 412 and 414 simultaneously, i.e. encoder engine 320 may encode a given frame while a read request for a subsequent frame is "in flight." In another embodiment, CPU 312 is configured to provide processed frames 366 to encoder engine 320, and step 412 may be skipped. At step 416, CPU 312 stores encoded frames 368 within flash memory 350. The method 400 then returns to step 402 and proceeds as described above. Although the method 400 has been described relative to processing video data, persons skilled in the art will recognize that the techniques described herein are equally applicable to other types of data, such as, e.g., audio data.

In sum, raw video data is captured, processed, and then stored within a set of buffers. An encoder engine is configured to encode the video data for storage. A feedback controller dynamically adjusts the clock frequency of the encoder engine based on the number of buffers currently occupied by the video data. The feedback controller is tuned so that the clock frequency of the encoder engine will be increased when the number of buffers occupied by video data increases, and the clock frequency of the encoder engine will be decreased when the number of buffers occupied by the video data decreases.

Advantageously, the power requirements of the encoder engine may be decreased because the number of idle clock cycles performed by the encoder engine may be reduced. Further, the core power supply of a subsystem that includes the encoder engine may be reduced compared to previous designs because the encoder engine may operate with a lower core power supply than previously possible.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for encoding data, the method comprising: identifying a number of buffers occupied by one or more portions of data;

adjusting an encoding clock frequency at which an encoder performs encoding operations to generate encoded data, wherein the encoding clock frequency is adjusted based on an output of a controller that receives, as inputs, the number of buffers occupied by the one or more portions of data and a current clock frequency associated with the encoder; and encoding the one or more portions of data at the encoding clock frequency to generate one or more portions of encoded data.

2. The computer-implemented method of claim 1, wherein the one or more portions of data are generated by:
capturing raw data via a sensor;
storing one or more portions of raw data in memory; and
processing the one or more portions of raw data via one or more processing stages to generate the one or more portions of data.

3. The computer-implemented method of claim 2, wherein the one or more processing stages include at least one of an image signal processing (ISP) stage and a two-dimensional (2D)/three-dimensional (3D) processing stage.

4. The computer-implemented method of claim 1, wherein the controller comprises a feedback controller.

5. The computer-implemented method of claim 4, wherein the feedback controller comprises a proportional-integral-derivative feedback controller.

6. The computer-implemented method of claim 4, wherein adjusting the encoding clock frequency for the encoder further comprises determining the output of the feedback controller when the number of buffers occupied by the one or more portions of data exceeds a threshold value, wherein the encoding clock frequency adjusted for the encoder is greater than the current clock frequency associated with the encoder.

7. The computer-implemented method of claim 4, wherein adjusting the encoding clock frequency for the encoder further comprises determining the output of the feedback controller when the number of buffers occupied by the one or more portions of data is less than a threshold value, wherein the encoding clock frequency adjusted for the encoder is less than the current clock frequency associated with the encoder.

8. The computer-implemented method of claim 1, wherein encoding the one or more portions of data comprises compressing the one or more portions of data according to a compression standard.

9. The computer-implemented method of claim 8, wherein the compression standard comprises an H.264 compression standard.

10. The computer-implemented method of claim 1, wherein the one or more portions of data comprise one or more frames of video data.

11. A non-transitory computer-readable medium storing program instructions that, when executed by a processor, cause the processor to encode data by performing the steps of:
identifying a number of buffers occupied by one or more portions of data;
adjusting an encoding clock frequency at which an encoder performs encoding operations to generate encoded data, wherein the encoding clock frequency is adjusted based on an output of a controller that receives, as inputs, the number of buffers occupied by the one or more portions of data and a current clock frequency associated with the encoder; and
encoding the one or more portions of data at the encoding clock frequency to generate one or more portions of encoded data.

12. The non-transitory computer-readable medium of claim 11, wherein the one or more portions of data are generated by:
capturing raw data via a sensor;
storing one or more portions of raw data in memory; and
processing the one or more portions of raw data via one or more processing stages to generate the one or more portions of data.

13. The non-transitory computer-readable medium of claim 12, wherein the one or more processing stages include at least one of an image signal processing (ISP) stage and a two-dimensional (2D)/three-dimensional (3D) processing stage.

14. The non-transitory computer-readable medium of claim 11, wherein the controller comprises a feedback controller.

15. The non-transitory computer-readable medium of claim 14, wherein the feedback controller comprises a proportional-integral-derivative feedback controller.

16. The non-transitory computer-readable medium of claim 14, wherein the step of adjusting the encoding clock frequency for the encoder further comprises determining the output of the feedback controller when the number of buffers occupied by the one or more portions of data exceeds a threshold value, wherein the encoding clock frequency adjusted for the encoder is greater than the current clock frequency associated with the encoder.

17. The non-transitory computer-readable medium of claim 14, wherein the step of adjusting the encoding clock frequency for the encoder further comprises determining the output of the feedback controller when the number of buffers occupied by the one or more portions of data is less than a threshold value, wherein the encoding clock frequency adjusted for the encoder is less than the current clock frequency associated with the encoder.

18. The non-transitory computer-readable medium of claim 11, wherein the step of encoding the one or more portions of data comprises compressing the one or more portions of data according to an H.264 compression standard.

19. The non-transitory computer-readable medium of claim 11, wherein the one or more portions of data comprise one or more frames of video data.

20. A subsystem configured to encode data, including: a processor, configured to: identify a number of buffers occupied by one or more portions of data, and adjust an encoding clock frequency at which an encoder performs encoding operations to generate encoded data, wherein the encoding clock frequency is adjusted based on an output of a controller that receives, as inputs, the number of buffers occupied by the one or more portions of data and a current clock frequency associated with the encoder; and the encoder, configured to: encode the one or more portions of data at the encoding clock frequency to generate one or more portions of encoded data.

* * * * *